(12) United States Patent
Hair et al.

(10) Patent No.: US 11,884,132 B2
(45) Date of Patent: Jan. 30, 2024

(54) CLIMATE CONTROL SYSTEM FOR A HYBRID OR ELECTRIC VEHICLE

(71) Applicant: FORD GLOBAL TECHNOLOGIES, LLC, Dearborn, MI (US)

(72) Inventors: Jonathan Hair, Royal Oak, MI (US); Brendan F. Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 372 days.

(21) Appl. No.: 17/443,691

(22) Filed: Jul. 27, 2021

(65) Prior Publication Data
US 2023/0033135 A1 Feb. 2, 2023

(51) Int. Cl.
*B60H 1/00* (2006.01)
*B60K 1/00* (2006.01)
(Continued)

(52) U.S. Cl.
CPC ......... *B60H 1/00735* (2013.01); *B60H 1/004* (2013.01); *B60H 1/00392* (2013.01);
(Continued)

(58) Field of Classification Search
CPC ............ B60H 1/00735; B60H 1/00392; B60H 1/004; B60H 1/3204; B60H 1/00278; B60H 1/143; B60K 1/00; B60K 6/26; B60K 6/28; B60K 6/20; B60K 2201/005; B60K 2201/006; B60K 2201/001; B60K 2201/003; B60K 17/06; B60K 11/02; B60L 15/20; B60L 2210/10; B60L 1/003; B60L 58/26; B60L 2240/34; B60L 2240/36; B60L 2240/425; B60L 2240/545; B60L 2250/26; B60L 2250/28; B60L 2260/52;
(Continued)

(56) References Cited

U.S. PATENT DOCUMENTS 9,776,469 B1 * 10/2017 Smith .................. B60W 20/15
2013/0098577 A1    4/2013 Larson
(Continued)

OTHER PUBLICATIONS

Leighton, D. Combined Fluid Loop Thermal Management for Electric Drive Vehicle Range Improvement, Google Scholar, SAE Int. World Congress & Exhibition, Apr. 2015, 10 pages. (Year: 2015).*
(Continued)

*Primary Examiner* — Russell Frejd
(74) *Attorney, Agent, or Firm* — David B Kelley; Brooks Kushman P.C.

(57) ABSTRACT

A vehicle includes an electrical powertrain, a heater, at least one cooling loop, and a controller. The heater is configured to heat a vehicle cabin. The at least one cooling loop is configured to transport waste heat from at least one subcomponent of the electrical powertrain to the vehicle cabin. The controller is programmed to, in response to a command to heat the vehicle cabin and a command to operate in an economy mode, shut down the heater and operate the at least one cooling loop to transport the waste heat to the vehicle cabin. The controller is further programmed to, in response to the command to heat the vehicle cabin and an absence of the command to operate in the economy mode, operate the heater to heat the vehicle cabin.

20 Claims, 3 Drawing Sheets

(51) Int. Cl.
*G07C 5/00* (2006.01)
*B60L 15/20* (2006.01)
*B60K 6/26* (2007.10)
*B60K 6/28* (2007.10)
*B60H 1/32* (2006.01)

(52) U.S. Cl.
CPC .............. *B60H 1/3204* (2013.01); *B60K 1/00* (2013.01); *B60K 6/26* (2013.01); *B60K 6/28* (2013.01); *B60L 15/20* (2013.01); *G07C 5/004* (2013.01); *B60K 2001/005* (2013.01); *B60K 2001/006* (2013.01); *B60L 2210/10* (2013.01); *B60Y 2200/91* (2013.01); *B60Y 2200/92* (2013.01); *B60Y 2306/05* (2013.01); *B60Y 2306/07* (2013.01)

(58) Field of Classification Search
CPC ................ G07C 5/004; B60Y 2200/91; B60Y 2200/92; B60Y 2306/05; B60Y 2306/07; B60Y 2400/301; B60Y 2400/302; B60Y 2400/3032; B60W 2510/087; B60W 2510/244; B60W 2510/246; B60W 2510/305; B60W 2530/209; B60W 2540/215; B60W 2710/305; B60W 10/08; B60W 10/30; Y02T 10/70
See application file for complete search history.

(56) References Cited

U.S. PATENT DOCUMENTS

| | | | |
|---|---|---|---|
| 2017/0282674 A1* | 10/2017 | Smith | B60W 50/082 |
| 2019/0070924 A1* | 3/2019 | Mancini | B60H 1/00564 |
| 2019/0225052 A1 | 7/2019 | Zenner et al. | |
| 2020/0055371 A1 | 2/2020 | Herr-Rathke et al. | |
| 2021/0331554 A1* | 10/2021 | Mancini | B60H 1/00921 |

OTHER PUBLICATIONS

Hemmati et al, S. Integrated Cabin Heating and Powertrain Thermal Energy Management for a Connected Hybrid Electric Vehicle, Google Scholar, Applied Energy, vol. 283, Feb. 2021, pp. 1-22. (Year: 2021).*

Lajunen et al, A. Review of Cabin Thermal Management for Electrified Passenger Vehicles, Google Scholar, IEEE Transactions on Vehicular Technology, vol. 69, Iss. 6, Jun. 2020, pp. 6025-6040. (Year: 2020).*

* cited by examiner

CLIMATE CONTROL SYSTEM FOR A HYBRID OR ELECTRIC VEHICLE

TECHNICAL FIELD

The present disclosure relates to control systems for hybrid and electric vehicles.

BACKGROUND

Electric vehicles may include an electric battery that is configured to deliver electric power to an electric machine that is configured to propel the vehicle.

SUMMARY

A vehicle includes an electric machine, a battery, at least one electrical accessory component, a heater, a plurality of cooling loops, and a controller. The electric machine is configured to propel the vehicle. The battery is configured to provide power to the electric machine. The at least one electrical accessory component is configured to electrically interact with at least one of the electric machine and the battery. The heater is configured to heat a vehicle cabin. The plurality of cooling loops is configured to transport waste heat away from the electric machine, battery, and at least one electrical accessory. The cooling loops are selectively configured to transport the waste heat to ambient surroundings or to the vehicle cabin. The controller is programmed to, in response to a command to heat the vehicle cabin and a command to operate in an economy mode, shut down the heater and operate the plurality of cooling loops to transport the waste heat to the vehicle cabin. The controller is further programmed to, in response to the command to heat the vehicle cabin and an absence of the command to operate in the economy mode, operate the heater to heat the vehicle cabin.

A vehicle includes an electrical powertrain, a heater, at least one cooling loop, and a controller. The heater is configured to heat a vehicle cabin. The at least one cooling loop is configured to transport waste heat from at least one subcomponent of the electrical powertrain to the vehicle cabin. The controller is programmed to, in response to a command to heat the vehicle cabin and a command to operate in an economy mode, shut down the heater and operate the at least one cooling loop to transport the waste heat to the vehicle cabin. The controller is further programmed to, in response to the command to heat the vehicle cabin and an absence of the command to operate in the economy mode, operate the heater to heat the vehicle cabin.

A vehicle includes an electric machine, a battery, an inverter, a DC to DC converter, a heater, a plurality of cooling loops, and a controller. The battery is configured to provide power to the electric machine. The inverter is configured to deliver power from the battery to the electric machine. The DC to DC converter is configured to deliver power from the battery to accessory components. The heater is configured to heat a vehicle cabin. The plurality of cooling loops are configured to (i) transport waste heat away from the electric machine, battery, inverter, and DC to DC converter, and (ii) transport the waste heat to the vehicle cabin. The controller is programmed to, in response to a command to heat the vehicle cabin in an economy mode, shut down the heater and operate the plurality of cooling loops to transport the waste heat to the vehicle cabin. The controller is further programmed to, in response to the command to heat the vehicle cabin in a conventional mode, operate the heater to heat the vehicle cabin.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
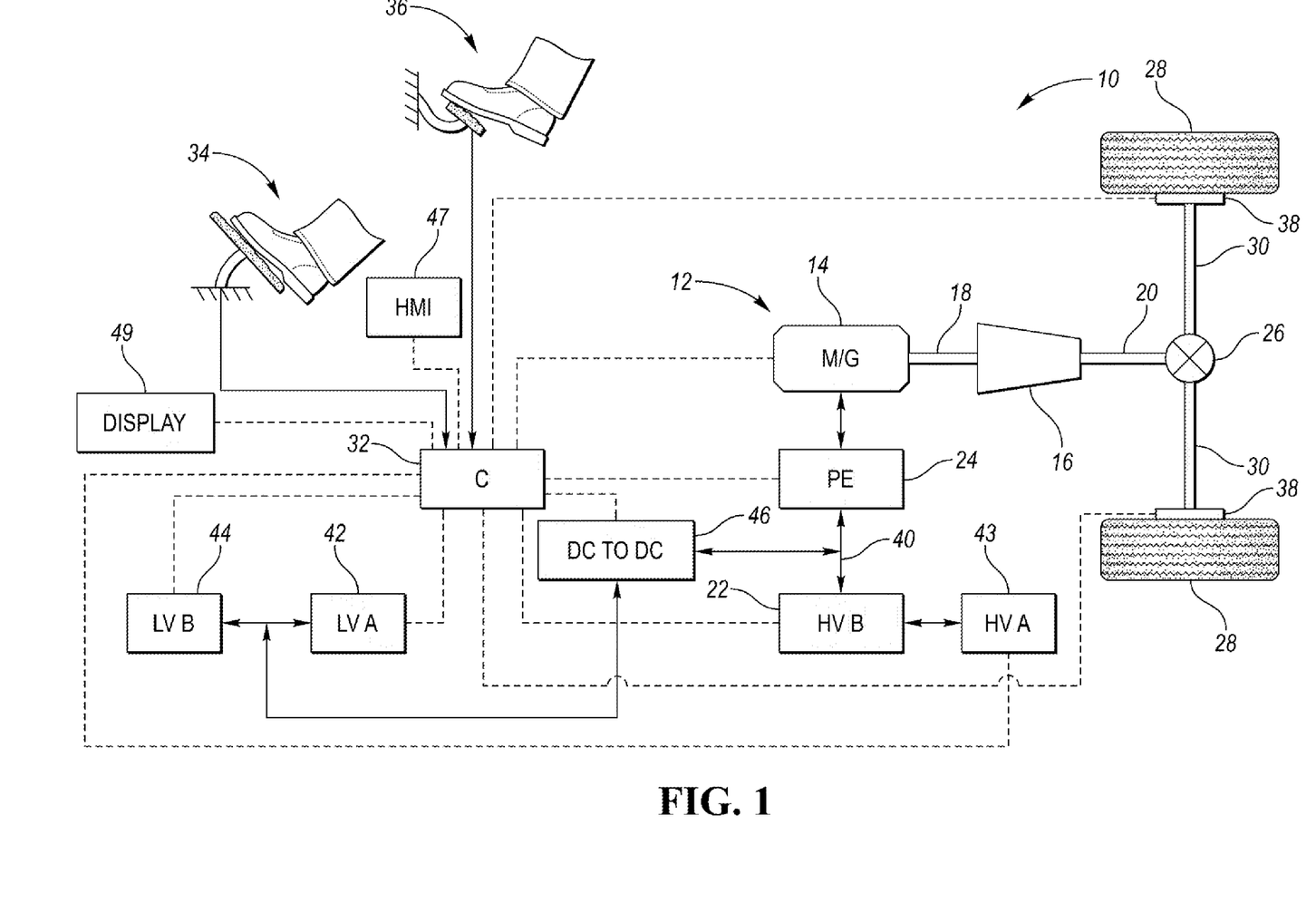
FIG. 1 is a schematic illustration of a representative powertrain of an electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 may more specifically be an electrical powertrain. The powertrain 12 includes an electric machine such as an electric motor/generator (M/G) 14 that drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VS S), coolant temperature (ECT), accelerator pedal position (PPS), ignition switch position (IGN), ambient air temperature (e.g., ambient air temperature sensor 33), transmission gear, ratio, or mode, transmission oil temperature (TOT), transmission input and output speed, deceleration or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The controller 32 also controls the timing of gear shifts within the transmission 16.

The M/G 14 may act as a motor and provide a driving force for the powertrain 12. To drive the vehicle with the M/G 14 the traction battery 22 transmits stored electrical energy through wiring 40 to the power electronics 24 that may include an inverter, for example. The power electronics 24 convert DC voltage from the battery 22 into AC voltage to be used by the M/G 14. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

The vehicle 10 may include one or more vehicle low-voltage accessories 42. The vehicle low-voltage accessories 42 may include, but are not limited to, power steering systems, radios, power windows, seat position adjustment systems, electrically operated door locks, head lights, interior cabin lights, or any other system or device that is electrically operated. The vehicle may include an accessory battery 44 that is configured to power the vehicle low-voltage accessories 42. The accessory battery 44 and the vehicle low-voltage accessories 42 may be in communication with and may be controlled by controller 32.

The accessory battery 44, the vehicle low-voltage accessories 42, and an associated bus that delivers power from the accessory battery 44 to the vehicle low-voltage accessories 42 may be referred to as a low-voltage power system, while, the traction battery 22, M/G 14, and an associated bus that delivers power from the traction battery 22 to the M/G 14 may be referred to as a high-voltage power system. This is because the traction battery 22, some accessories (such as the air conditioning system and the heating system), and the M/G 14 operate a higher voltage (e.g., 144-330 volts) relative to the accessory battery 44 and the vehicle low-voltage accessories 42 (e.g., 12 volts). The accessories that are powered by the high-voltage system (e.g., the air conditioning system and the heating system) may be referred to as the high-voltage accessories 43. Therefore, the traction battery 22 may be referred to as the high-voltage battery 22, the accessory battery 44 may be referred to as the low-voltage battery 44, the bus that delivers power from the traction battery 22 to the M/G 14 may be referred to as the high-voltage bus, and the bus that delivers power from the accessory battery 44 to the vehicle low-voltage accessories 42 may be referred to as the low-voltage bus. A DC to DC converter 46 may be configured to allow electrical power to flow from the low-voltage bus to the high-voltage bus and/or may be configured to allow electrical power to flow from the high-voltage bus to the low-voltage bus.

It should be understood that the schematic illustrated in FIG. 1 is merely representative and is not intended to be limiting. Other configurations are contemplated without deviating from the scope of the disclosure. It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

Figure 2:
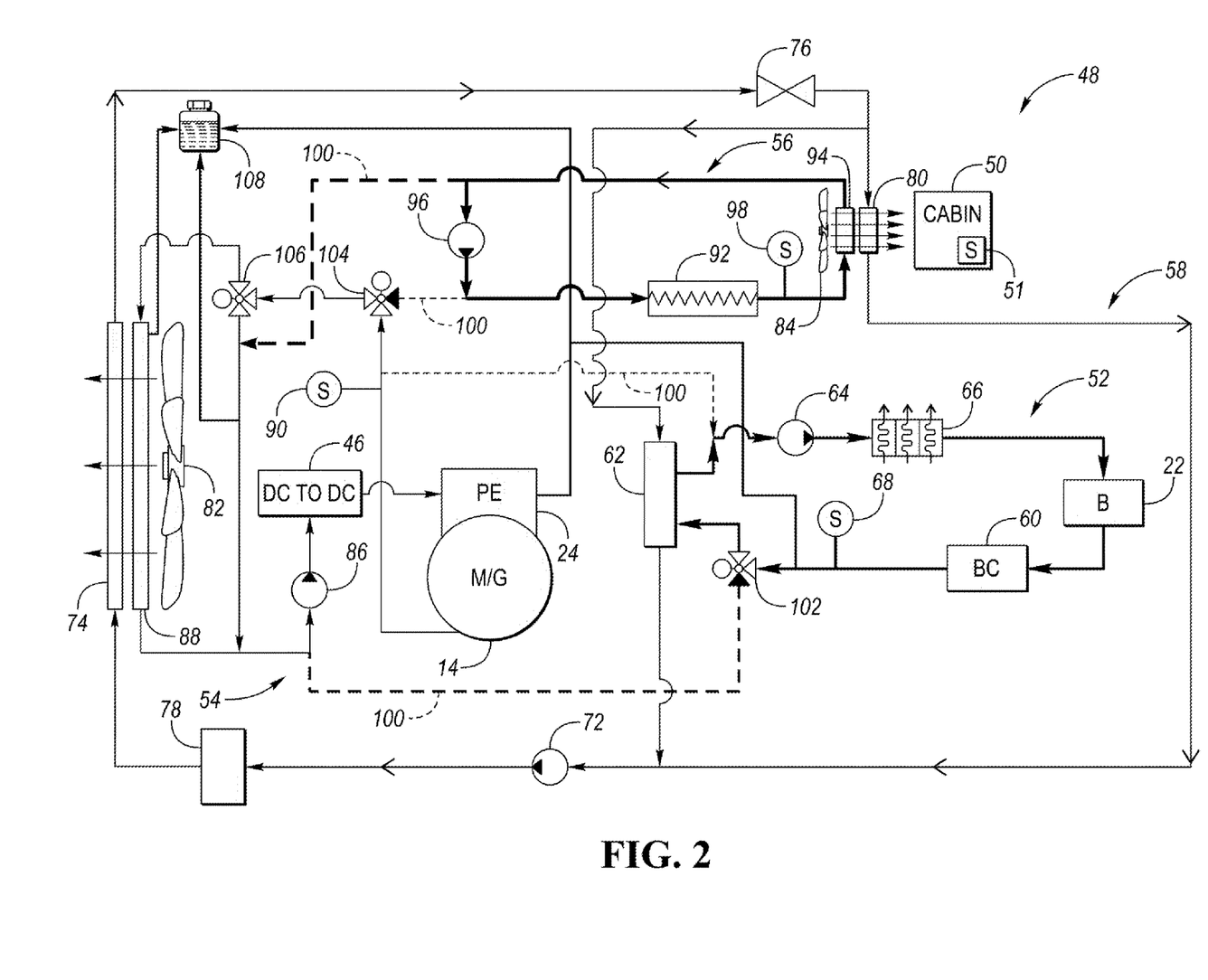
FIG. 2 is a schematic illustration of a heat exchanging system that is configured to cool various components of the powertrain and condition a vehicle cabin.

Referring to FIG. 2, a heat exchanging system 48 that is configured to cool various components of the powertrain 12 and condition a vehicle cabin 50 is illustrated. The heat exchanging system 48 includes a first coolant circuit or loop 52, a second coolant circuit or loop 54, a third coolant circuit or loop 56, and a refrigerant circuit or loop 58. The various electrical components (e.g., the battery 22, the battery controller 60, the M/G 14, the power electronics 24, and the DC to DC converter 46) being cooled via the heat exchanging system 48 may be subcomponents of the electrical powertrain 12. Some of the electrical components (e.g., the battery controller 60, the power electronics 24, and the DC to DC converter 46) being cooled via the heat exchanging system 48 may be referred to as electrical accessory components that electrically interact with the battery 22 and/or the M/G 14.

The first coolant loop 52 is configured to flow a coolant through or around the battery 22 and a battery controller 60 in order to cool the battery 22 and battery controller 60. The battery controller 60 may be part of or in communication with controller 32 and may include a battery charger that is configured to recharge the battery 22. More specifically, such a battery charger may be configured to direct electrical power to the battery 22 via a power source such as the M/G 14, a power grid via a plug, an induction charging system, etc.

The first coolant loop 52 may be configured to circulate coolant between the battery 22 and a chiller 62 in order to cool the battery 22. The first coolant loop 52 may also be referred to as a cooling loop. Heat generated by the battery 22 and the battery controller 60 is transferred to the coolant within the first coolant loop 52 and is then rejected to the refrigerant loop 58 via the chiller 62. The coolant within the first coolant loop 52 is supplied to the battery 22 from the chiller 62. The coolant is then flowed across (or through conduits within or adjacent to) both the battery 22 and the battery controller 60 in order to cool the battery 22 and the battery controller 60. The coolant is then flowed back to the chiller 62 where the heat transferred from the battery 22 to the coolant is then rejected to the refrigerant loop 58. The first coolant loop 52 may include a pump 64 that is configured to flow the coolant through the first coolant loop 52.

The first coolant loop 52 may also include an electric heater 66 that is configured to heat the coolant within the first coolant loop 52. The electric heater 66 may be in communication with the controller 32. A temperature sensor 68 may communicate the temperature of the coolant within the first coolant loop 52 to the controller 32. Alternatively, one or more temperature sensors may be positioned directly on the battery 22 and/or the battery controller 62. The controller 32 may be configured to operate the components of the first coolant loop 52 (e.g., pump 64 or electric heater 66) and the refrigerant loop 58 to either heat or cool the coolant with the first coolant loop 52 to drive the battery 22 and the battery controller 62 toward optimal operating temperatures based on a measurement of the temperature sensor 68.

The refrigerant loop 58 includes the chiller 62, a compressor 72, a condenser 74, and a thermal expansion valve 76. The refrigerant loop 58 may also include a receiver 78 and an evaporator 80. The evaporator 80 may be configured to cool air that is being introduced to the vehicle cabin 50. The evaporator 80 may be in parallel with the chiller 62 along the refrigerant loop 58. Heat generated within the first coolant loop 52 by the battery 22 or battery controller 60 is transferred to the refrigerant within the refrigerant loop 58 via the chiller 62. Heat may also be transferred to the refrigerant within the refrigerant loop 58 via the evaporator 80 while cooling the cabin 50. The refrigerant is then directed to the compressor 70 and then on to the condenser 74 via the receiver 78. The heat transferred to the refrigerant may then be transferred to the ambient surroundings (e.g., the ambient air) via the condenser 74. The refrigerant then returns to the thermal expansion valve 76. A first fan 82 may be configured to direct the ambient air across the condenser 74. The first fan 82 may be in communication with and controlled by controller 32. A second fan 84 may be configured to direct air across the evaporator 80. The second fan 84 may be in communication with and controlled by controller 32.

The second coolant loop 54 is configured to flow a coolant through or around the M/G 14, the power electronics 24 (or more specifically the inverting circuitry of the power electronics 24), and the DC to DC converter 46 to cool the M/G 14, the power electronics 24, and the DC to DC converter 46. The second coolant loop 54 may also be referred to as a cooling loop. The second coolant loop 54 may include a pump 86 that is configured to circulate coolant through the second coolant loop 54 and to the M/G 14, the power electronics 24, and the DC to DC converter 46. The second coolant loop 54 may include a heat exchanger 88, such as a radiator, that is configured reject heat generated by the M/G 14, the power electronics 24, and the DC to DC converter 46 to the ambient surrounding (e.g., the ambient air). The pump 86 may be in communication with the controller 32. A temperature sensor 90 may communicate the temperature of the coolant within the second coolant loop 54 to the controller 32. Alternatively, one or more temperature sensors may be positioned directly on the M/G 14, the power electronics 24, and/or the DC to DC converter 46. The controller 32 may be configured to operate the components of the second coolant loop 54 (e.g., pump 86) to cool the coolant with the second coolant loop 54 in order to drive the M/G 14, the power electronics 24, and the DC to DC converter 46 toward optimal operating temperatures based on a measurement of the temperature sensor 90. The first fan 82 or other fan may also be configured to direct the ambient air across heat exchanger 88.

The third coolant loop 56 is configured to flow a coolant through or around an electric heater 92 and a heater core 94. The electric heater 92 may be in communication with controller 32. The second fan 84 or other fan may be configured to direct air across the heater core to heat air that is being introduced into the cabin 50. The electric heater 92 is configured to heat the coolant within the third coolant loop 56 so that a desired temperature of the air being introduced into the cabin 50 may be obtained. A temperature sensor 98 may communicate the temperature of the coolant within the third coolant loop 56 to the controller 32. The third coolant loop 56 may include a pump 96 that is configured to circulate coolant through the third coolant loop 56 and to the electric heater 92 and the heater core 94. The controller 32 may be configured to operate the components of the third coolant loop 56 (e.g., pump 96 and electric heater 92) to heat the coolant within the third coolant loop 56 in order to heat and drive the air being introduced into the cabin 50 toward a desired temperature.

It should be noted that a heat pump could be utilized in addition to or as opposed to the electric heater 92 to heat the cabin air. For example, the second fan 84 or another fan may be configured to direct air across the condenser 74 in order to heat the air being introduced into the cabin 50. Under such a scenario, the refrigerant loop 58 would operate as a heat pump.

The first coolant loop 52 and the third coolant loop 56 may each be in communication with the second coolant loop 54 via interconnecting conduits 100 so that waste heat generated by the battery 22, the battery controller 60, the M/G 14, the power electronics 24, and the DC to DC converter 46 may all be directed to the heat exchanger 88 so that the waste heat can be rejected to the ambient surroundings. Valve 102 is configured to isolate the first coolant loop 52 from the second coolant loop 54, valve 104 is configured to isolate the third coolant loop 56 from the second coolant loop 54, and valve 106 is configured to isolate the second coolant loop 54 from the heat exchanger 88.

A portion of the waste heat generated by the battery 22, the battery controller 60, the M/G 14, the power electronics 24, and the DC to DC converter 46 may be directed to the third coolant loop 56 by operating valve 102 and valve 104 to (i) establish fluid communication between the first coolant loop 52 and the third coolant loop 56 via the second coolant loop 54 and (ii) establish fluid communication between the second coolant loop 54 and the third coolant loop 56. All or most of the waste heat generated by the battery 22, the battery controller 60, the M/G 14, the power electronics 24, and the DC to DC converter 46 may be directed to the third coolant loop 56 by operating valve 102, valve 104, and valve 106 to (i) establish fluid communication between the first coolant loop 52 and the third coolant loop 56 via the second coolant loop 54, (ii) establish fluid communication between the third coolant loop 56 and the second coolant loop 54, (iii) and isolate the second coolant loop 54 from the heat exchanger 88. The pumps, electric heaters, valves, compressor, fans, etc. illustrated in FIG. 2 may be powered by the battery 22 or other power source (e.g., M/G 14 or accessory battery 44).

Each of the first coolant loop 52, second coolant loop 54, and third coolant loop 56 may be connected to a degas or expansion bottle 108. The degas or expansion bottle 108 acts as an overflow vessel that stores coolant, particularly while the coolant has expanded in response to thermal expansion.

Figure 3:
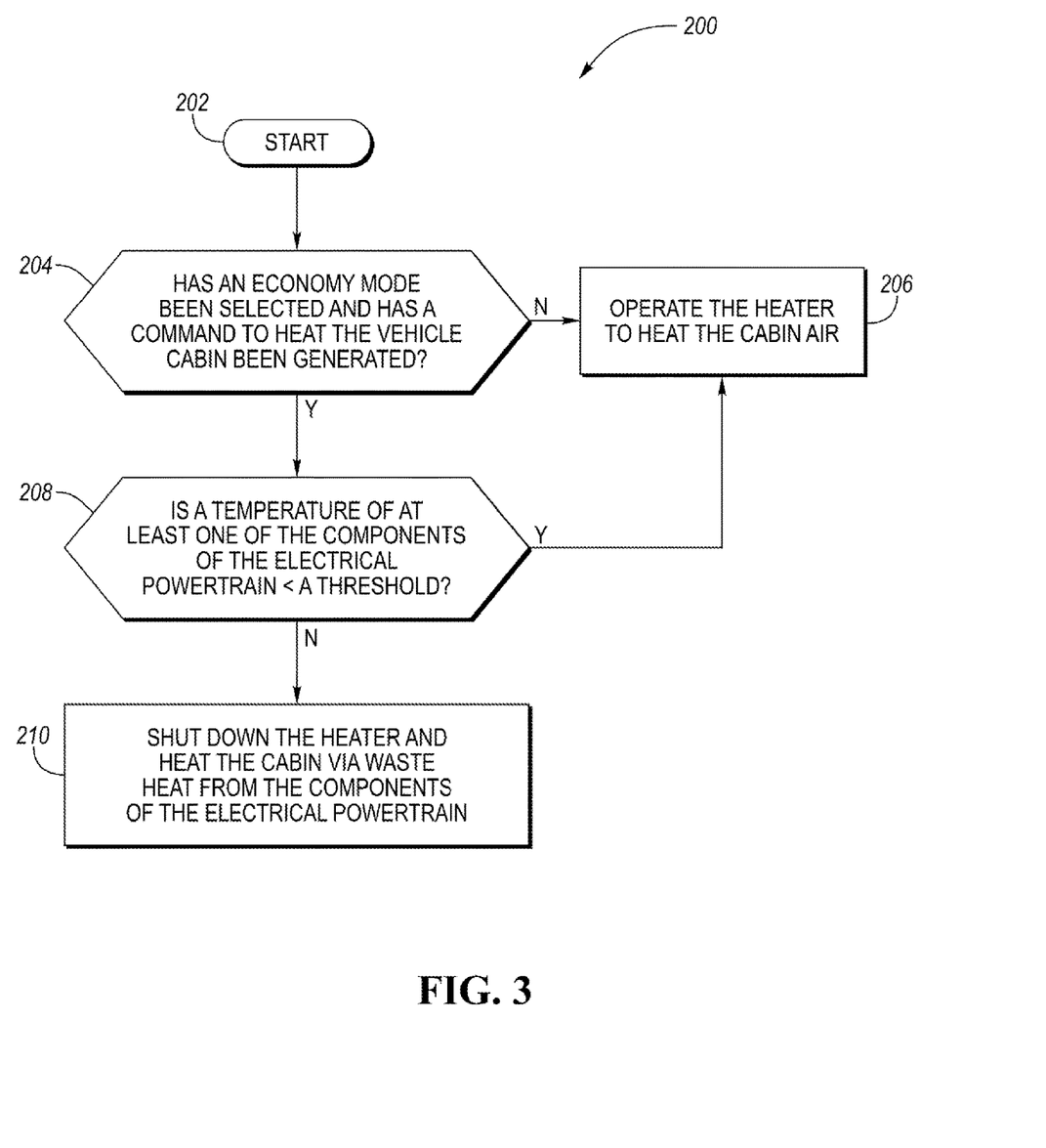
FIG. 3 is a flowchart illustrating a method for controlling the heat exchanging system.

Referring to FIG. 3, a flowchart of a method 200 for controlling the heat exchanging system 48 is illustrated. The method 200 may be stored as control logic and/or an algorithm within the controller 32. The method 200 is initiated at start block 202. Next, the method 200 moves on to block 204 where it is determined if an economy mode has been selected and if a command to heat the vehicle cabin 50 has been generated. A command to operate in the economy mode and a command to heat the vehicle cabin 50 may each be generated via an operator of the vehicle 10 selecting the economy mode and selecting to heat the vehicle cabin 50 via a control panel or human machine interface (HMI). An HMI is illustrated as item 47 in FIG. 1. The HMI 47 may be in communication with the controller 32. If the command to heat the vehicle cabin 50 has been generated and the economy mode has not been selected (and therefore no command to operate in the economy mode has been generated), the method 200 moves on to block 206 where the heat exchanging system 48 is operated in a conventional mode where the heater 92 is utilized to heat the air being introduced to the vehicle cabin 50. It should be noted that in the absence of selecting the economy mode, heating the cabin air may or may not be supplemented via waste heat from the battery 22, the battery controller 60, the M/G 14, the power electronics 24, and the DC to DC converter 46 by controlling valves 102 and 104 so that the first coolant loop 52 and second coolant loop 54 are either in or are not in fluid communication with the third coolant loop 56. More specifically, the controller 32 may operate the valves 102. 104, and 106 only under optimal conditions to transport the heat waste to the third coolant loop 56 from the first coolant loop 52 and second coolant loop 54. Optimal conditions may correspond to the temperature of the coolant within the first coolant loop 52 and second coolant loop 54 being equal to or greater than the coolant within the third coolant loop 56.

Returning to block 204, if the command to heat the vehicle cabin 50 has been generated and the economy mode has been selected (and therefore a command to operate in the economy mode has been generated), the method 200 moves on to block 208. Once the economy mode has been selected, a display unit my notify the vehicle operator that the economy mode has been selected. A display unit is illustrated as item 49 in FIG. 1.

The controller 32 may also be configured to operate the display unit 49 to display a distance-to-empty estimation that may be based on a charge of the battery 22. The distance-to-empty estimation may also be based on an amount of fuel that is stored if the vehicle 10 is a hybrid vehicle that includes an engine. The controller 32 may also be configured to operate the display unit 49 to update the distance-to-empty estimation upon selection of the economy mode or the conventional mode, and may be configured to operate the display unit 49 to unit to display an available increase in the distance-to-empty estimation by selecting the economy mode as opposed to the conventional mode. The economy mode will increase the range of the vehicle since additional energy will not be directed to the heater 92.

At block 208 it is determined if a temperature of at least one of the components of the electric powertrain 12 (i.e., the battery 22, the battery controller 60, the M/G 14, the power electronics 24, and the DC to DC converter 46) is less than a threshold. Alternatively, at block 208 it may be determined if a temperature of the coolant within at least one of the first coolant loop 52 and second coolant loop 54 is less than the threshold. If the temperature of at least one of the components of the electric powertrain 12 (or the temperature of the coolant within at least one of the first coolant loop 52 and second coolant loop 54) is not less than the threshold, the method moves on to block 210 where the heater 92 is shutdown and the waste heat from the battery 22, the battery controller 60, the M/G 14, the power electronics 24, and the DC to DC converter 46 is delivered to the vehicle cabin 50 via the heater core 94 to heat the vehicle cabin. More specifically, valves 102 and 104 are controlled so that coolant can flow into the third coolant loop 56 from the first coolant loop 52 and second coolant loop 54 so that the waste heat from the battery 22, the battery controller 60, the M/G 14, the power electronics 24, and the DC to DC converter 46 is delivered to the heater core 94. Valve 106 may also be controlled to isolate the heat exchanger 88 so that no heat is lost to the ambient surroundings at block 210. Furthermore, the controller 32 may direct heat only to occupied portions of the vehicle cabin 50 at block 210. Occupied portions of the vehicle cabin 50 may be communicated to the controller 32 via sensors, such seat belt sensors or weight sensors on the seats. Such sensors are illustrated as item 51 in FIG. 2.

Returning to block 208, if the temperature of at least one of the components of the electric powertrain 12 (or the temperature of the coolant within at least one of the first coolant loop 52 and second coolant loop 54) is less than the threshold, the method 200 overrides shutting down the heater 92 and moves on to block 206 where the heat exchanging system 48 is operated in the conventional mode where the heater 92 is utilized to heat the air being introduced to the vehicle cabin 50. It should also be noted that if the temperature of at least one of the components of the electric powertrain 12 (or the temperature of the coolant within at least one of the first coolant loop 52 and second coolant loop 54) is less than the threshold at block 208, the valves 102, 104, and 106 may be operated to isolate the third coolant loop 56 from the first coolant loop 52 and the second coolant loop 54. The temperature threshold may correspond to a value where the temperature of the coolant within the first coolant loop 52 and/or the second coolant loop 54 is lower than the temperature of the coolant within the third coolant loop 56. Therefore, in order to prevent heat loss in the third coolant loop while cabin heating is being requested, the first coolant loop 52 and the second coolant loop 54 are isolated from the third coolant loop via operating valves 102, 104, and 106.

It should be understood that the flowchart in FIG. 3 is for illustrative purposes only and that the method 200 should not be construed as limited to the flowchart in FIG. 3. Some of the steps of the method 200 may be rearranged while others may be omitted entirely.

It should be understood that the designations of first, second, third, fourth, etc. for any component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
an electric machine configured to propel the vehicle;
a battery configured to provide power to the electric machine;
at least one electrical accessory component configured to electrically interact with at least one of the electric machine and the battery;
a heater configured to heat a vehicle cabin;
a plurality of cooling loops configured to transport waste heat away from the electric machine, battery, and at least one electrical accessory, wherein the cooling loops are selectively configured to transport the waste heat to ambient surroundings or to the vehicle cabin; and
a controller programmed to,
in response to a command to heat the vehicle cabin and a command to operate in an economy mode, shut down the heater and operate the plurality of cooling loops to transport the waste heat to the vehicle cabin, and
in response to the command to heat the vehicle cabin and an absence of the command to operate in the economy mode, operate the heater to heat the vehicle cabin.

2. The vehicle of claim 1 further comprising a display unit, and wherein the controller is further programmed to operate the display unit to display a distance-to-empty estimation.

3. The vehicle of claim 2, wherein the controller is further programmed to, update the distance-to-empty estimation displayed on the display unit upon selection of the economy mode.

4. The vehicle of claim 2, wherein the controller is further programmed to operate the display unit to display an available increase in the distance-to-empty estimation in the economy mode.

5. The vehicle of claim 1, wherein the controller is further programmed to, in response to (i) the command to heat the vehicle cabin, (ii) the command to operate in an economy mode, and (iii) at least one of the electric machine, battery, and at least one electrical accessory component having a temperature that is less than a threshold, override shutting down the heater.

6. The vehicle of claim 1, wherein the heater is an electrical heater.

7. The vehicle of claim 1, wherein the heater is a heat pump.

8. The vehicle of claim 1, wherein the controller is further programmed to, in response to the command to heat the vehicle cabin and the command to operate in an economy mode, direct heat only to occupied portions of the vehicle cabin.

9. The vehicle of claim 1, wherein the at least one electrical accessory component is a DC to DC converter, an inverter, or a battery charger.

10. A vehicle comprising:
an electrical powertrain;
a heater configured to heat a vehicle cabin;
at least one cooling loop configured to transport waste heat from at least one subcomponent of the electrical powertrain to the vehicle cabin; and
a controller programmed to,
in response to a command to heat the vehicle cabin and a command to operate in an economy mode, shut down the heater and operate the at least one cooling loop to transport the waste heat to the vehicle cabin, and
in response to the command to heat the vehicle cabin and an absence of the command to operate in the economy mode, operate the heater to heat the vehicle cabin.

11. The vehicle of claim 10, wherein the controller is further programmed to, in response to the command to heat the vehicle cabin and the absence of the command to operate in the economy mode, operate the heater and the at least one cooling loop to heat the vehicle cabin.

12. The vehicle of claim 10 further comprising a display unit, and wherein the controller is further programmed to operate the display unit to display an available increase in a distance-to-empty estimation in the economy mode.

13. The vehicle of claim 10, wherein the controller is further programmed to, in response to (i) the command to heat the vehicle cabin, (ii) the command to operate in an economy mode, and (iii) the at least one subcomponent of the electrical powertrain having a temperature that is less than a threshold, override shutting down the heater.

14. The vehicle of claim 10, wherein the controller is further programmed to, in response to (i) the command to heat the vehicle cabin, (ii) the command to operate in an economy mode, and (iii) the at least one cooling loop having a temperature that is less than a threshold, override shutting down the heater.

15. The vehicle of claim 10, wherein the heater is an electrical heater or a heat pump.

16. The vehicle of claim 10, wherein the at least one subcomponent of the electrical powertrain is an electric machine.

17. The vehicle of claim 10, wherein the at least one subcomponent of the electrical powertrain is an inverter.

18. The vehicle of claim 10, wherein the at least one subcomponent of the electrical powertrain is a traction battery.

19. The vehicle of claim 10, wherein the at least one subcomponent of the electrical powertrain is a DC to DC converter.

20. A vehicle comprising:
an electric machine;
a battery configured to provide power to the electric machine;
an inverter configured to deliver power from the battery to the electric machine;
a DC to DC converter configured to deliver power from the battery to accessory components;
a heater configured to heat a vehicle cabin;
a plurality of cooling loops configured to (i) transport waste heat away from the electric machine, battery, inverter, and DC to DC converter, and (ii) transport the waste heat to the vehicle cabin; and a controller programmed to,
- in response to a command to heat the vehicle cabin in an economy mode, shut down the heater and operate the plurality of cooling loops to transport the waste heat to the vehicle cabin, and
- in response to the command to heat the vehicle cabin in a conventional mode, operate the heater to heat the vehicle cabin.

* * * * *